United States Patent Office 3,142,718
Patented July 28, 1964

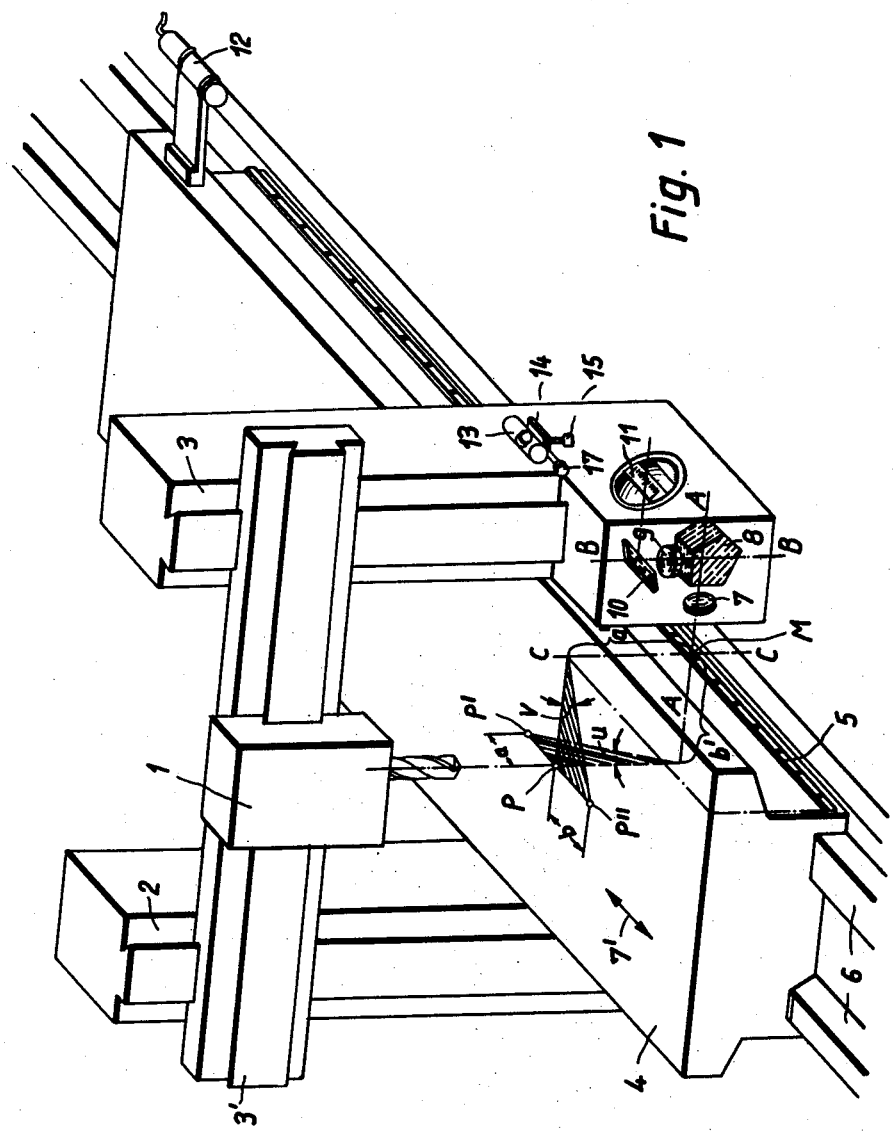

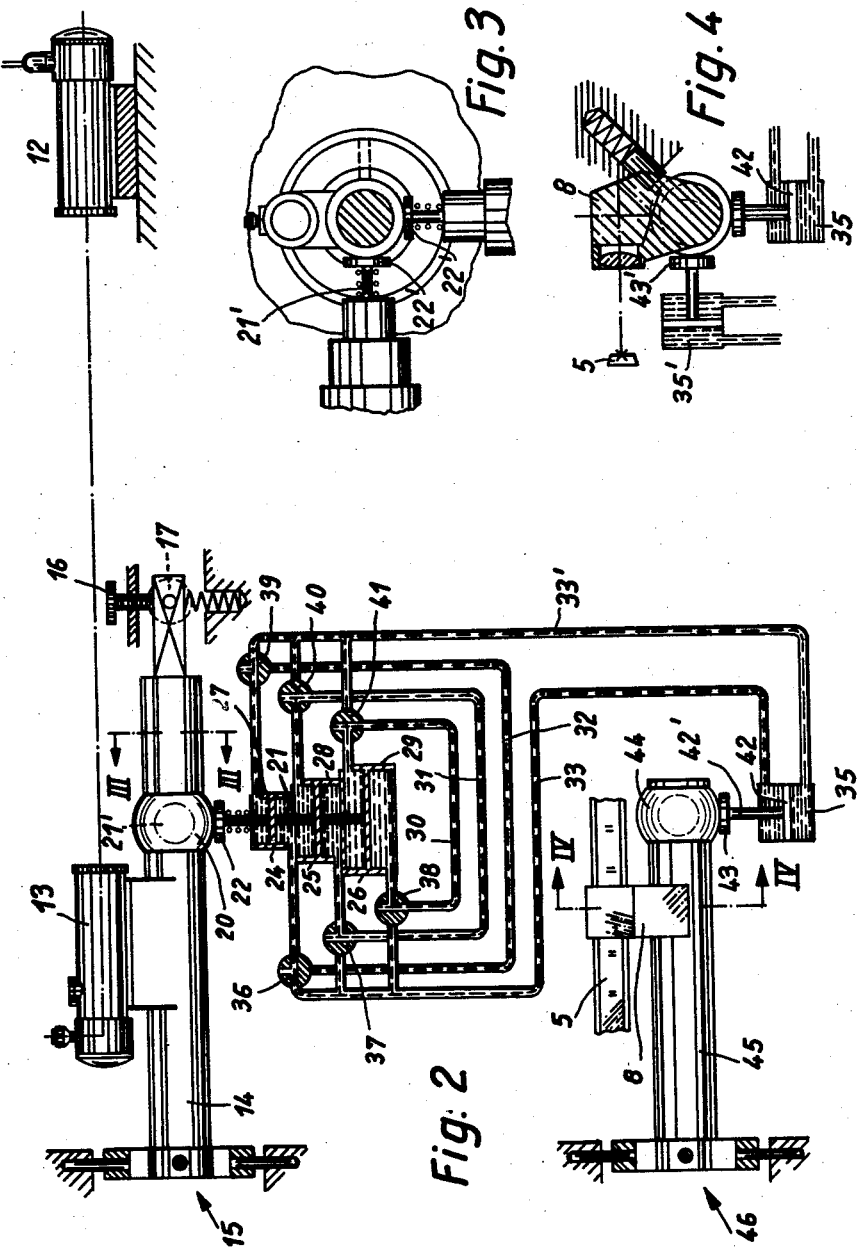

3,142,718
OPTICAL EQUIPMENT FOR THE ACCURATE SETTING AND READING OF THE AMOUNT OF DISPLACEMENT OF A SLIDE
Kurt Räntsch and Adolf Weyrauch, Wetzlar, Germany, assignors to M. Hensoldt & Söhne, Optische Werke AG., Wetzlar (Lahn), Germany
Filed Sept. 30, 1960, Ser. No. 59,550
Claims priority, application Germany Oct. 3, 1959
8 Claims. (Cl. 88—14)

The invention relates to a device for adjusting and reading the amount of displacement of a slide carriage. More in particular, the invention relates to an optical device for compensating errors occurring when a slide carriage is position adjusted in a machine such as a machine tool, a length measuring apparatus and the like.

Machines, such as machine tools, length measuring devices and the like apparatus are frequently equipped with a slide carriage and a fixed bed relative to which the slide carriage is capable of lateral and vertical displacement. A fixed portion of the machine carries a measuring scale and the slide carriage is equipped with a reading device, or vice versa. The reading unit comprises a graticule and optical means for projecting a section of the measuring scale onto the graticule.

In these known apparatus the measuring and reading operation is rendered inaccurate and unreliable by virtue of the inevitable tolerances of the guide means for the slide carriage. As a consequence of such tolerances and even virtual defects in construction of the guide the slide carriage is subject to certain tilting movements in the course of displacement, which, in turn, lead to false measuring or reading values. These tilting movements specifically consist in a first movement about an axis positioned in the guide plane of the carriage, and a second movement about an axis which is normal to the guide plane of the carriage. The tilting movements will cause a measuring point positioned on the slide carriage above the measuring scale to be displaced towards the guide of the carriage, whereas the second undesired movement will cause a measuring point positioned laterally of the measuring scale is displaced towards the guide means of the carriage. This is, of course, highly undesirable, since, for instance, a measuring point constituting the work point of a machine tool, is displaced to an inaccurate position. Consequently, a particular operation, such as the boring of a hole is performed at the wrong location.

With the foregoing in mind it is the object of the present invention to provide a device for adjusting and reading the amount of displacement of a slide carriage whereby errors due to the afore-mentioned two tilting movements are compensated.

This object as well as further objects and advantages which will become apparent as the description proceeds are accomplished by the apparatus of the present invention according to which a reading unit displaceable relative to a measuring scale in a machine such as a machine tool comprises a graticule and optical means for projecting a section of a measuring scale on the graticule and which further comprises means for checking on the accurate position of a slide carriage with respect to horizontal, lateral and vertical displacement of the carriage. The last-mentioned means may consist, for example, of a collimator connected with a fixed portion of the machine and a telescope connected with the slide carriage, or vice versa. The light beam is in the direction of sliding. Furthermore, the invention provides means for readjusting the afore-mentioned checking means following an inaccurate lateral and vertical position of the slide carriage such as, for example, a Cardan shaft supporting the above-mentioned telescope and two screws spaced by 90° from one another whereby the telescope can be displaced perpendicular to the direction of sliding and laterally and vertically to coincide with the collimator. In addition the device of the invention comprises at least one optical compensating member for compensating inaccurate vertical and lateral positions of the slide carriage in the reading unit, and finally, transmission and follow up control means are disposed between the readjusting means and the optical compensating member, as well as means for varying the transmission ratio.

If the slide carriage performs an inaccurate position the mark of the collimator moves out of coincidence with a cross-hair in the telescope. The telescope is then readjusted until the mark of the collimator recoincides with the cross-hair. This movement of readjustment of the telescope is transmitted to the optical compensating member which so deflects the imaging path of rays of the measuring scale that the image of the particular division stroke of the scale is positioned at the location in the reading device which is accurately coordinated with the correct work point.

The means for changing the transmission ratio are provided in order to vary the distance between the measuring or working point and the scale. This distance must be changed in view of the fact that with equal values of inaccurate displacement of the slide carriage the displacement of the measuring or working point varies according to the distance of such point from the measuring scale. Since the distance of the work point from the scale varies, for example in machine tools, with various work pieces, it becomes necessary to adapt the transmission ratio between the readjusting means, the follow up control and the optical compensating member accordingly.

The present invention will be more fully understood upon the description of the accompanying drawings, wherein FIGURE 1 is a perspective view of part of the device of the invention illustrated in combination with the slide carriage of a machine tool;

FIGURE 2 is a partly sectional view of the telescope and collimator means and hydraulic transmission means and the means for varying the transmission ratio;

FIGURE 3 is a fragmentary, partly sectional view taken along lines III—III in FIGURE 2;

FIGURE 4 is a fragmentary sectional view taken along lines IV—IV in FIGURE 2;

Figure 5:
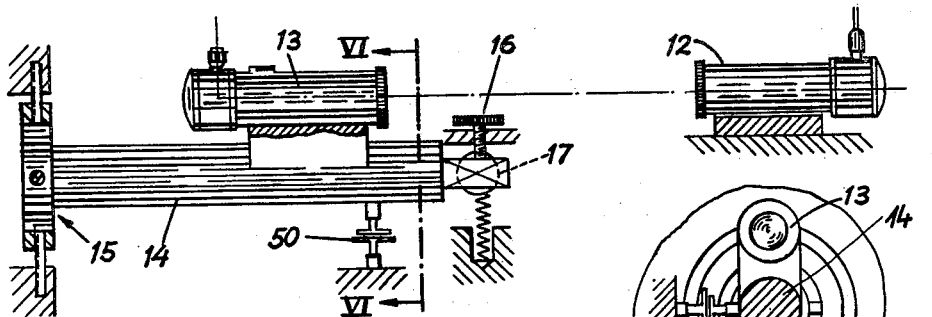
FIGURE 5 is an elevational view illustrating electric transmission means in the device of the invention.

FIGURE 1 shows, by way of an example, a boring machine with a tool such as a drill bit 1 which can be displaced in vertical guides 2, 3 and a horizontal guide 3'. The tool is supported by a work table 4 constituting a slide carriage which can be displaced in a guide 6 in the directions of double-headed arrow 7'. A scale 5 is mounted on the work table or slide carriage 4. By means of a projecting unit division strokes on scale 5 can be projected into a reading window 11 including a graticule. This projecting unit includes an objective 7, a pentaprism 8, a further lens 9 and a mirror 10. By means of displacing the carriage 4 in the directions of arrow 7' the drill may be set with respect to a work point P.

In the afore-described known structure it may occur that the guide 6 is inaccurate and consequently the slide carriage may perform undesired displacements. The slide carriage 4 can thus be tilted, for example, about axis A—A by an angle $u$. As a consequence of this tilting displacement the work point P will be shifted to position P' which results in an error of adjustment $a$. It may furthermore occur that the slide carriage 4 performs a rotary movement about axis C—C by an angle $v$, whereby work point P is shifted to P'' which results in an error of adjustment $b$. Since both the axes A—A and C—C pass through the measuring point M the latter point is projected into its presupposed position in reading window 11 in spite of the fact that the point P has been shifted. As a consequence, the observer will not notice the wrong adjustment of slide carriage 4.

By means of the structure of the inevntion the adjusting errors $a$ and $b$ are compensated. For that purpose, the slide carriage 4 is provided with means for checking on the accurate position of the slide carriage, for example a collimator 12 having a mark projected to infinity and parallel relative to guide 6 if the slide carriage 4 is in its accurate position, but non-parallel relative to guide 6 if the slide carriage has undergone an erroneous displacement. The checking means further comprise a telescope 13 fixedly connected to the machine and thus being stationary with respect to carriage 4. Telescope 13 has a cross-hair coinciding with the reference of the collimator 12 if the slide carriage 4 is in its accurate position.

The device of the invention further has means for re-adjusting the checking means following an inaccurate lateral and vertical position (both perpendicular to the direction of double-arrow 7') of the slide carriage: the telescope 13 is mounted on a lever 14 which, in turn, is positioned on a Cardan shaft 15 and which can be shifted vertically and laterally by means of two adjusting screws 16 and 17, until the reference mark of the collimator 12 coincides with the cross-hair of telescope 13.

As will next be described with particular reference to FIGURES 2 to 9 there is provided at least one optical compensating member in the path of rays of measuring point M which is displaced following a movement of telescope 13.

The compensating member consists, for example, of a prism 8, which can be pivoted about axes A—A and B—B. Furthermore, the device of the invention comprises transmission and follow up control means for transmitting the movement of telescope 13 and lever 14 to prism 8.

These transmission and follow up control means may consist, for example, of a hydraulic unit illustrated in FIGURES 2 to 4. The lever 14 has a spherical portion 20 which is in contact with a disk 22 mounted on a piston rod 21, and further contacting another disk 22' mounted on another piston rod 21'. Piston rod 21 can be moved in the plane of the drawings whereas piston rod 21' is displaceable vertically relative to the plane of the drawings. The piston rod 21 supports a plurality of pistons 24, 25, 26 having various diameters and moving in cylinders 27, 28, and 29, respectively. The cylinders contain a pressure medium and are connected with one another and with a further cylinder 35 by means of conduit pipes 30, 31, 32, 33. Three-way valves 36, 37, 38, 39, 40, 41, are provided in the pipe conduits. Cylinder 35 receives a piston 42 mounted on a piston rod 42'. The latter supports a disk 43 contacting the spherical portion 44 of a lever 45. Lever 45 is mounted on a Cardan shaft 46 and supports the pentaprism 8.

If lever 14 is moved in the plane of the drawings this movement is transmitted to piston 42 via pistons 24, 25, and 26. According to the respective positions of three-way valves 36 through 41 only one or several or all of the pistons 24, 25, 26 participate in the transmission. In the position illustrated in FIGURE 2 piston 24 presses the liquid in the lower portion of cylinder 27 through pipe conduit 33 onto piston 42 so that the latter is moved downwardly. The liquid below piston 42 flows back into cylinder 27 via a pipe conduit 33'. The liquid below pistons 25 and 26 is pressed into the cylinder portion above pistons 25 and 26 via conduits 31 and 30 so that pistons 25 and 26 are not actuated. If, however, valves 37 and 40 are operated so that piston 25 also presses liquid into conduit 33, a greater amount of displacement of piston 42 will result. It will thus be seen that the three-way valves can be operated to vary the transmission ratio of the transmission between lever 14 and lever 45. This adjustment is needed for adjusting the distance $a'$ and $b'$, constituting the distance of point P from measuring point M. This adjustment becomes necessary in-as-much as these distances $a'$ and $b'$ condition the values of the erroneous displacement $a$ and $b$.

It will be noted that transmission of a movement of lever 14 vertically relative to the plane of the drawing of FIGURE 2 is effected by an entirely analogous structure via piston rod 21'. This transmission structure which is identical to the structure illustrated in FIGURE 2 actuates by means of a plate 43' the spherical-shaped portion 44 of lever 45 in a direction vertical relative to the plane of the drawing.

According to another embodiment of the invention illustrated in FIGURES 5 to 9 electrically operated means transmit the movement of telescope 13 to lever 45 carrying the optical compensating member, i.e. pentaprism 8.

These electric transmission and follow-up control means includes two channels, one of which is described in the following and comprise a capacitor 50 the distance of its plates being varied by means of lever 14. Lever 45 is operatively connected with a two-armed lever 51 which varies the distance between the plate of a further capacitor 52. The capacitors 50 and 52 are electrically connected in a bridge circuit constituting branches thereof and operating a relay 53 which, in turn, actuates a follow-up motor 54. The motor turns a gear 56 meshing with a rack 57 of lever 51. Lever 51 is rotatable about pivot 58. The pivot 58 may be so adjusted in the direction of arrow 59 that the effective length of lever 51 can be changed. The adjustment in length of lever 51 becomes necessary to change the transmission ratio between levers 14 and 45 so as to adjust distance $a'$.

The operation of this electric transmission channel and follow-up control is as follows: an inclination of lever 14 will change the capacity of capacitor 50 unbalancing the bridge so that relay 53 is operated to start motor 54. Motor 54 then tilts lever 51 via gear 56 and rack 57 until the respective capacities of the two capacitors 50 and 52 have become equal.

Figure 6:
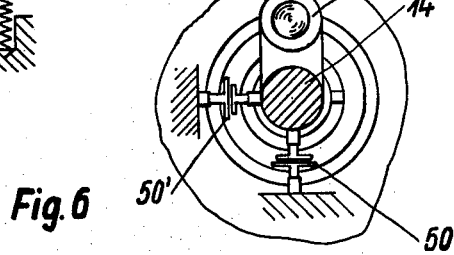
FIGURE 6 is a sectional view taken along lines VI—VI in FIGURE 5.
Figures 7, 8:
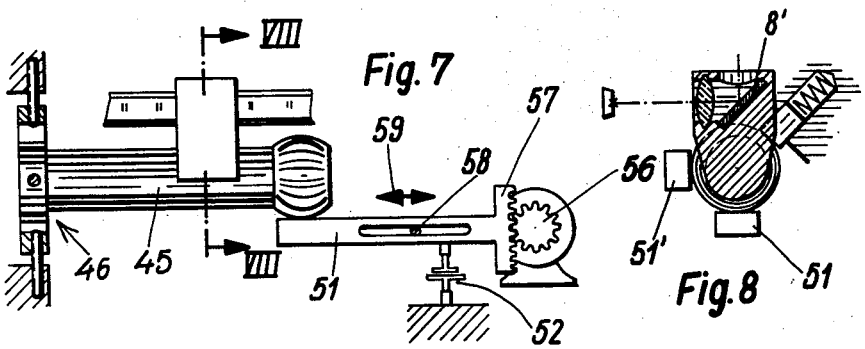
FIGURE 7 is a somewhat schematic view of another embodiment of electric transmission means in the device of the invention.
FIGURE 8 is a fragmentary sectional view taken along lines VIII—VIII in FIGURE 7.
Figure 9:
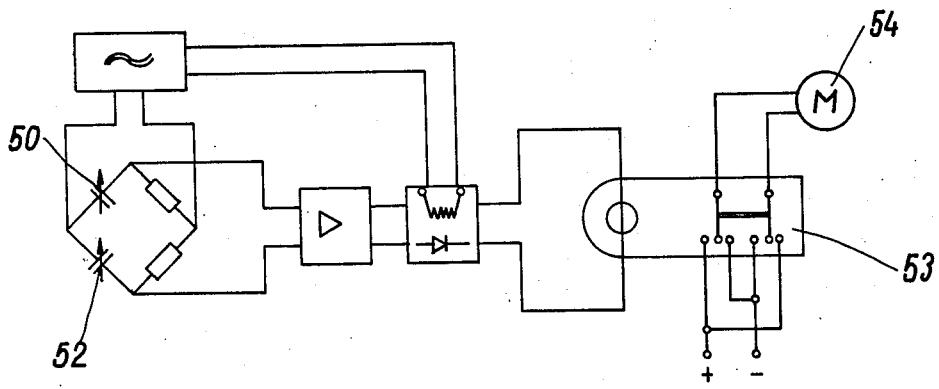
FIGURE 9 is a wiring diagram of the electric transmission shown in FIGURES 7 and 8.

An entirely similar, second electric transmission and follow-up control channel, not shown, is provided for moving lever 45 vertically relative to the plane of the drawing of FIG. 7. FIG. 6 and FIG. 8 show, that there is a capacitor 50' corresponding to capacitor 50 and that there is a second lever 51' corresponding to lever 51. Bridge and follow-up control of such second channel correspond to the one shown. It will be noted that the plate of capacitor 50 which is connected with lever 14 is somewhat smaller than its counter plate, and that the plate of capacitor 52 connected with lever 51 also is somewhat smaller than its counter plate. This arrangement will prevent a change in capacity of the capacitors 50 and 52 following a movement of lever 51. FIG. 8 also discloses, that pentaprism 8 can be substituted by a mirror 8'.

It will be noted that the capacitors 50 and 52 can be replaced by inductances, resistors and the like.

Figure 10:
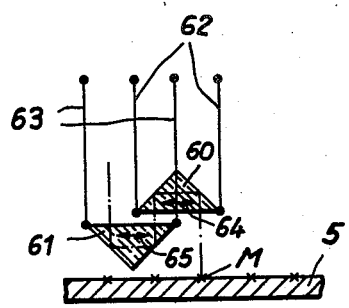
FIGURE 10 is a fragmentary, somewhat schematic view of another embodiment of control transmission means in the device of the invention.
Figure 11:
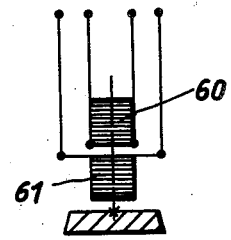
FIGURE 11 is a side view of FIGURE 10.

In the afore-described embodiment the optical compensating member consisted in a pentaprism 8 or a mirror 8'. It is, however, also possible to provide two rectangular prisms 60 and 61. These prisms are arranged as shown in FIGURE 10 in suspended relationship on parallelogram structures 62 and 63 so that the light rays from measuring point M first enter prism 60 and then enter prism 61. Both prisms can be displaced relative to the measuring scale in the directions of arrows 64 and 65.

Hydraulic or electric transmission means of the afore-described types can be so associated with the optical compensating member that, for example, a first transmission is operatively connected with prism 60 so as to compensate adjustment error $a$ and a second transmission is operatively connected with prism 61 so as to compensate adjustment error $b$.

Figure 12:
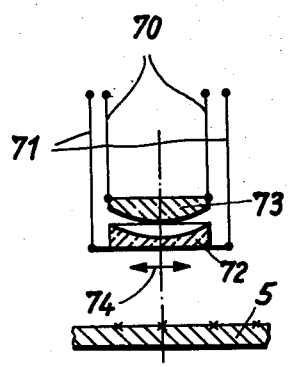
FIGURE 12 is a fragmentary somewhat schematic view of another embodiment of the compensating elements and the transmission means according to the invention.
Figure 13:
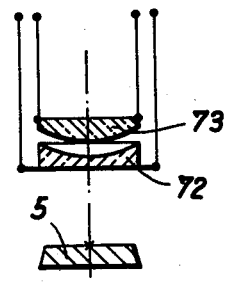
FIGURE 13 is a side view of FIGURE 12.

The compensating means may also comprise the structure illustrated in FIGURES 12 and 13, i.e. the lenses 72 and 73 suspended on parallelogram structure 70 and 71 forming a Boskowitsch wedge. The lenses 72 and 73 are displaced parallel to measuring scale 5 in direction of arrow 74 by means of two transmission means of the afore-described type.

Figure 14:
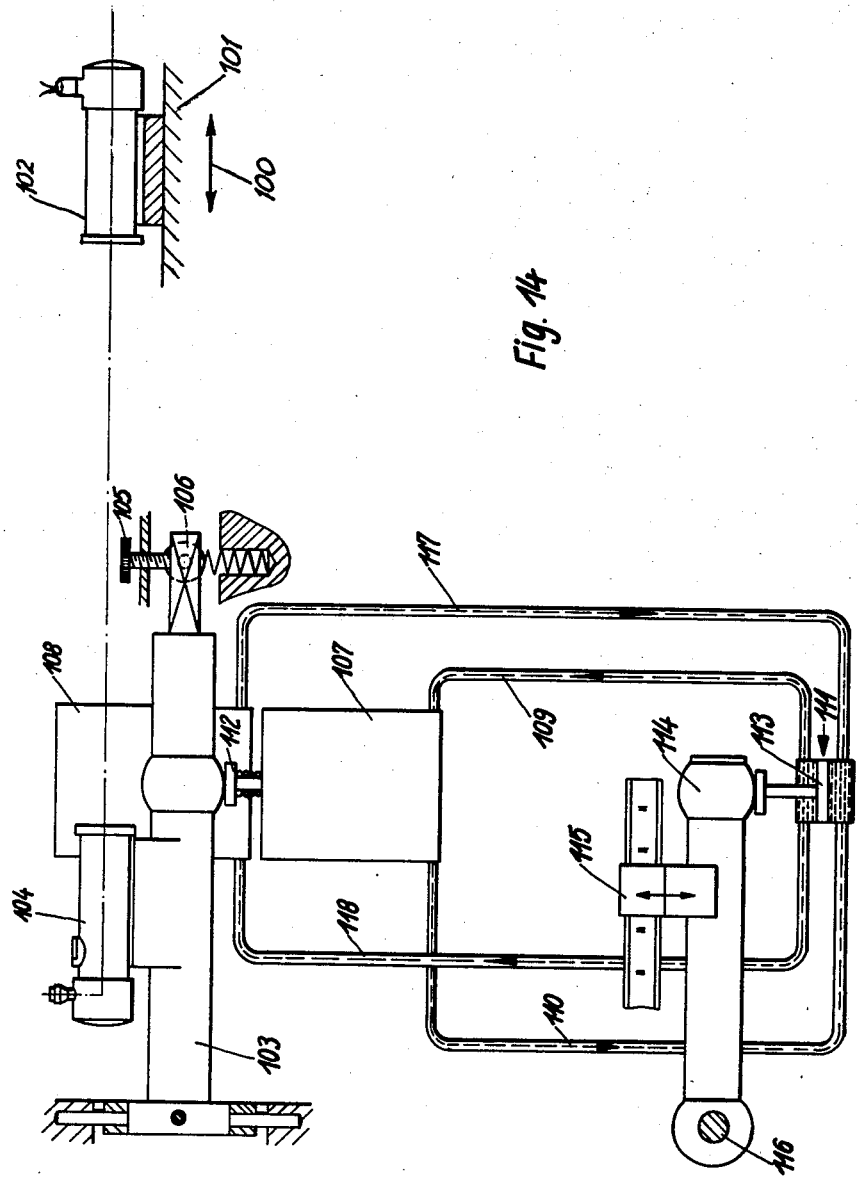
FIGURE 14 is a schematic view of another embodiment of the device of the invention.
Figure 15:
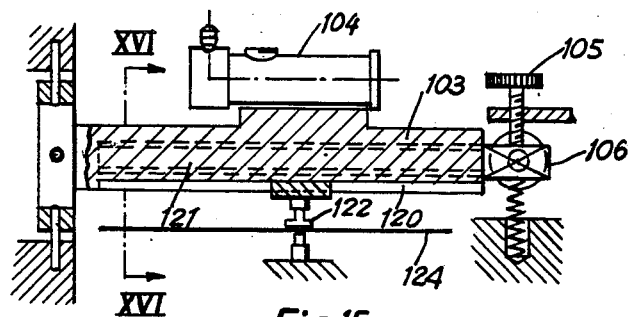
FIGURE 15 is a schematic view of still another embodiment of the device of the invention.
Figure 16:
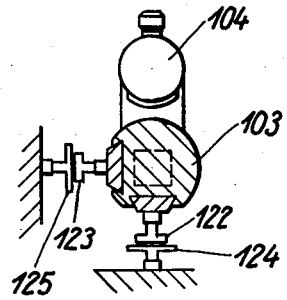
FIGURE 16 is a sectional view taken along lines XVI—XVI in FIGURE 15.
Figure 17:
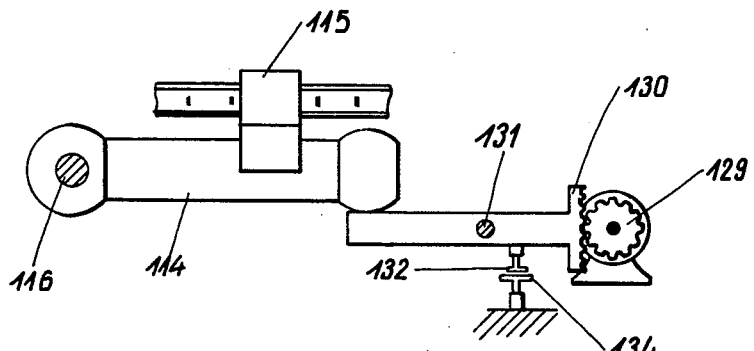
FIGURE 17 is a detailed view of part of the device of FIGURE 15.
Figure 18:
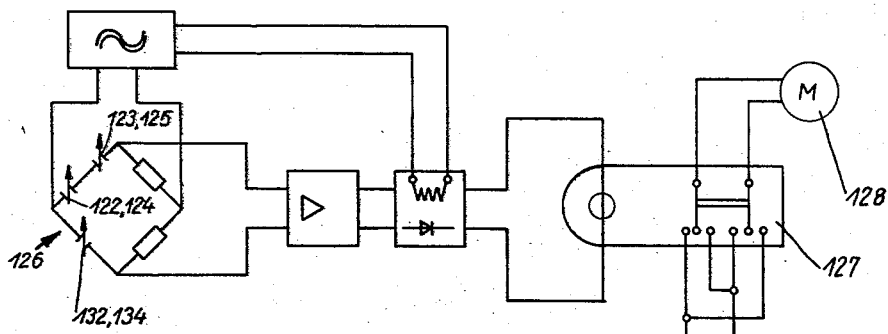
FIGURE 18 is a wiring diagram of the device of FIGURES 15 to 17.

A modification of the device of the invention is illustrated in FIGURE 14 showing a work table 101 displaceable in direction of arrow 100. A collimator 102 is mounted on table 101 and has a mark projected to infinity. A lever 103 is positioned in a fixed portion of the machine and supports the telescope 104. Due to a guide error of table 101 the reference mark on the collimator 102 will move out of coincidence with the cross-hair of telescope 104. By means of screws 105, 106, the telescope is moved until coincidence between cross-hair and reference mark is reestablished. The movement is transmitted to a pair of hydraulic transmissions 107 and 108. Transmission 107 is connected with a cylinder 111 via two pipe conduits 109 and 110. Cylinder 111 receives a piston 113.

If pressure is exerted on the hydraulic unit 107 by lever 103 and plate 112, pressure liquid passes through conduit 110 into cylinder 111, whereby piston 113 is lifted and pressure liquid above the piston passes back into unit 107. Piston 113 lifts lever 114 thereby displacing prism 115. In contrast with the embodiment of FIGURE 2 lever 114 can be pivoted only about shaft 116. Furthermore, unit 108 is also connected with cylinder 111 via pipe conduits 117 and 118 so that movement of lever 103 vertically relative to the plane of the drawing will convey liquid through conduit 117 into the lower portion of cylinder 111 so as to displace piston 113 and thereby lever 114 and prism 115. The pressure liquid returns into unit 108 through conduit 118.

An electric transmission is illustrated in FIGURES 15 to 18. Lever 103 supports telescope 104 and has two guides 120 and 121 in which capacitor plates 122 and 123 can be displaced. The counter plates of capacitors 124 and 125 are stationary and have a length which is somewhat greater than the length of displacement of plates 122 and 123. A displacement of lever 103 in order to establish coincidence of cross-hair and reference mark changes the distance of plates 122 and 123 thereby changing the capacity of capacitors 124 and 125, the amount of change in capacity depending on the position of plates 122, 123 in guides 120 and 121. The capacitors 124, 125 are series connected in a bridge circuit 126. A change of capacity will unbalance the bridge and operate a relay 127 starting motor 128. Motor 128 drives the gear 129 meshing with a rack 130 which latter is rotatable about a fixed shaft 131. The plate 132 of a capacitor 134 is connected with rack 130 and is also provided in the bridge circuit 126. As soon as motor 128 has moved rack 130 so that the capacity of capacitor 134 is identical to the capacity of capacitors 124, 125 the balance of bridge 126 is reestablished and operation of motor 128 is discontinued. The optical compensating member, e.g. prism 115 is thus operated by the afore-described transmission actuating the motor 128 and rack 130, which latter moves lever 114 supporting the prism 115.

Figure 19:
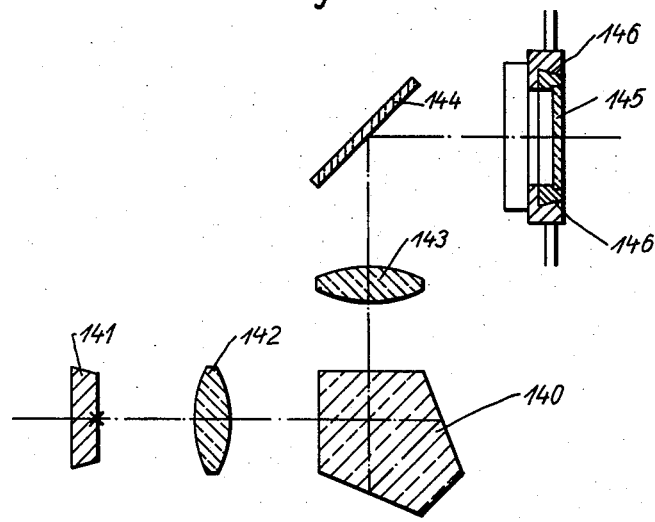
FIGURES 19 and 20 are schematic views illustrating still another embodiment of the invention.
Figure 20:
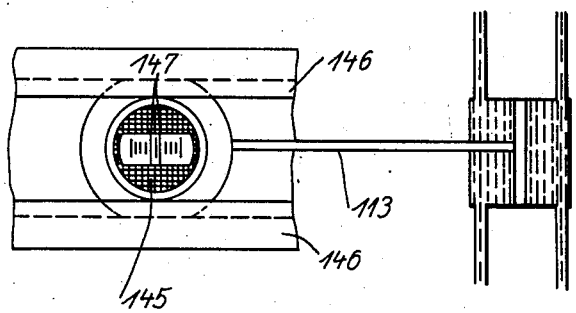

According to a further modification the optical compensating member consists in a stationary prism 140 as illustrated in FIGURE 19. The division strokes of measuring scale 141 are projected onto the graticule 145 of a reading unit by means of lens 142, prism 140, a further lens 143, and a mirror 144. Graticule 145 is displaceable in a guide 146, for instance by means of a piston 113 of the type illustrated in FIGURE 14. As will be seen in FIGURE 20, a division stroke, such as a double stroke 147 of measuring scale 141 is projected onto graticule 145. A reference scale is provided on graticule 145. The compensation is effected as follows: graticule 145 is displaced in guide 146 following a movement of piston 113 of the transmission. As a result double stroke 147 captures another reference stroke of the reference scale thereby compensating a guide error.

It will be understood that this invention is susceptible to modification in order to adapt it to different usages and conditions and, accordingly, it is desired to comprehend such modifications within this invention as may fall within the scope of the appended claims.

What is claimed is:

1. A device for accurately determining the position of a slide carriage sliding an a stationary bed comprising: a scale connected to one of said carriage and said bed and extending in the direction of sliding; a reading unit connected to the other one of said carriage and said bed, said unit including a graticule and optical means for projecting a section of said scale onto said graticule, either of said graticule and an element of said optical means constituting a displaceable optical compensation member, first and second control means for respectively displacing said optical compensation member in two different directions so as to laterally displace the relative position of said graticule and of the optical axis of projection; optical illumination means for projecting a light beam along said direction of sliding; instrument means for determining relative deflections of said beam perpendicular to the optical axes thereof, one of said instrument means and said optical means being connected to said carriage moving therewith while the other one is connected to said bed; means for shifting one of said instrument means and said illumination means in two different directions extending in a plane perpendicular to said light beam; and a two-channel-follow-up means, each channel being individually responsive to the shifting in one direction and being connected for laterally displacing in one direction, one of said graticule and said element of said optical means.

2. A device for accurately determining the position of a slide carriage sliding on a stationary bed comprising: a scale connected to one of said carriage and said bed and being indicative of the amount of sliding; a reading unit connected to the other one of said carriage and said bed, said unit including a graticule and optical means for projecting a section of said scale onto said graticule, said optical means including a member disposed in the light path of projection and being tiltable in two directions defining a plane so that the projection of said section is shiftable along said graticule; optical illumination means for projecting a light beam along said direction of sliding; instrument means for determining deflections of said beam relative to said instrument perpendicular to said direction of sliding, one of said instrument means and said optical means being connected to said carriage moving therewith while the other one is connected to said bed; means for shifting one of said instrument means and said illumination means in two different directions extending in a plane perpendicular to said light beam; and follow up means directionally responsive to said shifting and controlling the tilting of said member.

3. In a device for adjusting and reading the amount of displacement of a slide carriage capable of lateral and vertical displacement relative to a fixed bed, comprising a measuring scale and a reading unit displaceable relative to one another, said reading unit comprising a graticule and optical means for projecting a section of said scale onto said graticule; the improvement of means to compensate for error in the position of said slide carriage with respect to horizontal lateral and vertical displacement of the latter, projection means for projecting a beam along the direction of sliding, and instrument means for determining deflection of said beam, follow up means for readjusting said compensating means following an inaccurate lateral and vertical position of said slide carriage, at least one optical compensating member disposed in the path of rays of said optical projection means in the path of rays of said reading unit for compensating inaccurate vertical and lateral positions of said slide, carriage, transmission means between said follow up means and said optical compensating member, said transmission means comprising a plurality of hydraulic cylinder and piston means, a piston rod common to said cylinder and piston means and operatively connected with said follow up means, one further cylinder and piston means operatively connected with said optical compensating member, pipe conduit means connecting said plurality of cylinder and piston means with each other and with said one further cylinder and piston means, and three way valves in said pipe conduit means so that one or several of said cylinder and piston means may be caused to participate in transmission of movement from said follow up means to said optical compensating member, and means for varying the transmission ratio of said transmission means.

4. In a device for adjusting and reading the amount of displacement of a slide carriage capable of lateral and vertical displacement relative to a fixed bed, comprising a measuring scale and a reading unit displaceable relative to one another, said reading unit comprising a graticule and optical means for projecting a section of said scale onto said graticule; the improvement of means to compensate for error in the position of said slide carriage with respect to horizontal lateral and vertical displacement of the latter, projection means for projecting a beam along the direction of sliding, and instrument means for determining deflection of said beam, follow up means for readjusting said compensating means following an inaccurate lateral and vertical position of said slide carriage, at least one optical compensating member disposed in the path of rays of said optical projection means in the path of rays of said reading unit for compensating inaccurate vertical and lateral positions of said slide carriage, transmisison means between said follow up means and said optical compensating means, said transmission means comprising a plurality of hydraulic cylinder and piston means of various diameters, a piston rod common to said cylinder and piston means and operatively connected with said follow up means, one further cylinder and piston means operatively connected with said optical compensating member, pipe conduit means connecting said plurality of cylinder and piston means with each other and with said one further cylinder and piston means, and three-way valves in said pipe conduit means so that one or several of said cylinder and piston means may be caused to participate in transmission of movement from said follow up means to said optical compensation member, and means for varying the transmission ratio of said transmission means.

5. In a device for adjusting and reading the amount of displacement of a slide carriage capable of lateral and vertical displacement relative to a fixed bed, comprising a measuring scale and a reading unit displaceable relative to one another, said reading unit comprising a graticule and optical means for projecting a section of said scale onto said graticule; the improvement of means to compensate for error in the position of said slide carriage with respect to horizontal lateral and vertical displacement of the latter projection means for projecting a beam along the direction of sliding, and instrument means for determining deflection of said beam, follow up means for readjusting said compensating means following an inaccurate lateral and vertical position of said slide carriage, at least one optical compensating member disposed in the path of rays of said optical projection means in the path of rays of said reading unit for compensating inaccurate vertical and lateral positions of said slide carriage, transmission means between said follow up means and said optical compensating means, said transmission means comprising an electric bridge circuit, a first capacitor in said bridge circuit operatively connected with said follow up means so as to change in capacity when operated by the latter, a second capacitor in said bridge circuit operatively connected with said optical compensating member, so as to change in capacity when operated by the latter, and relay and motor means drivingly connected with said optical compensating member and operating as long as said first capacitor is changed in capacity by said follow up means, and until said second capacitor has been changed in capacity by said optical compensating member so as to have the same capacity as said first capacitor, and means for varying the transmission ratio of said transmission means.

6. In a device for adjusting and reading the amount of displacement of a slide carriage capable of lateral and vertical displacement relative to a fixed bed, comprising a measuring scale and a reading unit displaceable relative to one another, said reading unit comprising a graticule and optical means for projecting a section of said scale onto said graticule; the improvement of means to compensate for error in the position of said slide carriage with respect to horizontal, lateral and vertical displacement of the latter, said last named means comprising a stationary collimator having a reference mark, and a displaceable telescope having a cross-hair, a lever supporting said telescope, a Cardan shaft connected with one end of said lever, follow up means for readjusting said compensating means following an inaccurate lateral and vertical position of said slide carriage, said follow up means comprising a pair of adjusting screws for pivoting the other end of said lever in two planes normal relative to one another, so as to make coincide the cross-hair in said telescope with the reference mark in said collimator, at least one optical compensating member disposed in the path of rays of said optical projection means in the path of rays of said reading unit for compensating inaccurate vertical and lateral positions of said slide carriage, transmission means between said follow up means and said optical compensating member, and means for varying the transmission ratio of said transmission means.

7. In a device according to claim 5, further comprising a length-extensible lever operatively connected with said second capacitor on the one hand, and said optical compensation member, on the other hand.

8. In a device according to claim 5, with said capacitors having a plate and a counter plate, with said plates being smaller than said counter plates.

References Cited in the file of this patent
UNITED STATES PATENTS

| | | |
|---|---|---|
| 2,474,602 | Turrettini | June 28, 1949 |
| 2,692,527 | Wetzel et al. | Oct. 26, 1954 |
| 2,924,768 | Farrand et al. | Feb. 9, 1960 |
| 3,026,620 | Rantsch | Mar. 27, 1962 |